G. J. LETCHWORTH.
HAMES.
No. 170,177. Patented Nov. 23, 1875.
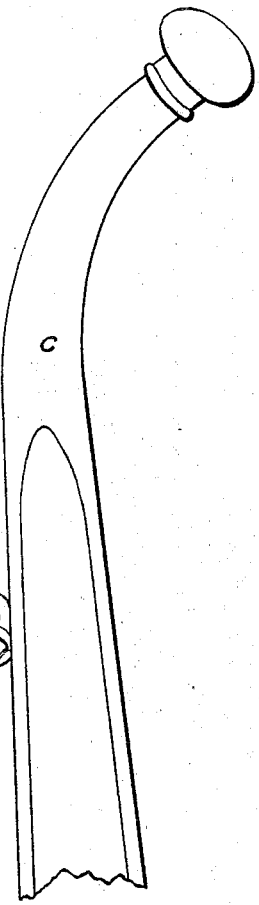
Fig., 1.
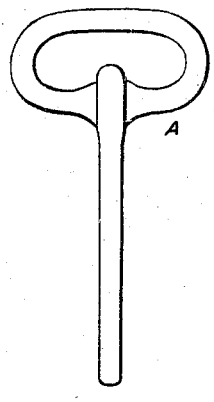
Fig., 2.
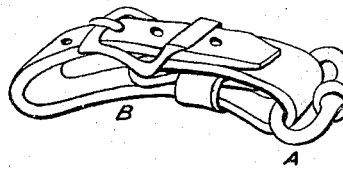
WITNESSES: INVENTOR:

UNITED STATES PATENT OFFICE.

GEORGE J. LETCHWORTH, OF AUBURN, NEW YORK.

IMPROVEMENT IN HAMES.

Specification forming part of Letters Patent No. 170,177, dated November 23, 1875; application filed November 5, 1875.

*To all whom it may concern:*

Be it known that I, GEORGE J. LETCHWORTH, of Auburn, Cayuga county, State of New York, have invented an Improvement in Hames, of which the following is a specification:

My invention is fully illustrated in Figure 1 of the drawing, in which it has been deemed necessary to show only the top end of the hame, to which my invention more particularly relates.

In Fig. 1, A represents the loop; B, the hame-strap and buckle; C, a section of hame.

In Fig. 2, A represents a full-size view of the loop.

My improvement consists of a loop, A, or other fastening, with or without a joint, attached, in any manner that may be desired, to the inside of a high-top hame, at its upper portion, as represented in Fig. 1. To or through the loop A is attached or passed the hame-strap B, or other attachment, holding the two hames together, and by means of which the hames are held in their proper place on the collar.

When the hame is in use on a small collar, the hame-strap can be drawn nearly or quite in a straight line from loop to loop.

When required for a larger collar, the hame-strap, on being buckled a little longer, can be arched over the top of the collar from loop to loop, without making any change in the location of the loop.

I am aware of a number of devices for holding the tops of high-top hames in their place on the collar, such as a hole or holes passing through the top of the hame to admit of the hame-strap; and of loops or staples on the outside of the hame for the same purpose; also, of a loop banding the whole hame and adjustable up or down, (reference to patent of G. J. LETCHWORTH, January 11, 1870;) but I am not aware of any device like mine, whereby the attachment is stationary and located on the inside of the hame.

This device is simple and cheap, and makes a handsome finish, and at the same time admits of the hame being used on a smaller or larger collar.

What I claim as my invention, and desire to secure by Letters Patent, is—

A loop or other fastening, of any desired form, attached to the inside of a high-top hame, for the purpose of holding the hame to the collar in its proper place, substantially as described and set forth.

G. J. LETCHWORTH.

Witnesses:
BYRON C. SMITH,
FRANK R. RATHBUN.